United States Patent
Akenine-Moller et al.

(10) Patent No.: US 10,045,029 B2
(45) Date of Patent: Aug. 7, 2018

(54) CLUSTERING AND ENCODING FOR COLOR COMPRESSION

(71) Applicant: Intel Corporation, Santa Clara, CA (US)

(72) Inventors: Tomas G. Akenine-Moller, Lund (SE); Jon N. Hasselgren, Bunkeflostrand (SE); Carl J. Munkberg, Malmo (SE)

(73) Assignee: Intel Corporation, Santa Clara, CA (US)

(*) Notice: Subject to any disclaimer, the term of this patent is extended or adjusted under 35 U.S.C. 154(b) by 181 days.

(21) Appl. No.: 14/270,435

(22) Filed: May 6, 2014

(65) Prior Publication Data
US 2015/0326862 A1    Nov. 12, 2015

(51) Int. Cl.
| | |
|---|---|
| H04N 19/136 | (2014.01) |
| H04N 19/137 | (2014.01) |
| H04N 19/186 | (2014.01) |
| H04N 19/50 | (2014.01) |
| G06T 9/00 | (2006.01) |
| G06T 11/00 | (2006.01) |
| H04N 1/41 | (2006.01) |
| H04N 19/426 | (2014.01) |
| G06T 11/40 | (2006.01) |

(52) U.S. Cl.
CPC ........... *H04N 19/136* (2014.11); *G06T 9/00* (2013.01); *G06T 11/00* (2013.01); *G06T 11/40* (2013.01); *H04N 1/41* (2013.01); *H04N 19/137* (2014.11); *H04N 19/186* (2014.11); *H04N 19/428* (2014.11); *H04N 19/50* (2014.11)

(58) Field of Classification Search
CPC ................................................... H04N 19/136
USPC ...................................................... 375/240.08
See application file for complete search history.

(56) References Cited

U.S. PATENT DOCUMENTS

| | | | |
|---|---|---|---|
| 6,762,758 B2 | 7/2004 | Morein et al. | |
| 7,952,756 B1 * | 5/2011 | Kulkarni | H04N 1/6058 358/1.9 |

(Continued)

FOREIGN PATENT DOCUMENTS

| | | |
|---|---|---|
| JP | 03-220871 A | 9/1991 |
| WO | 2009124248 A1 | 10/2009 |

(Continued)

OTHER PUBLICATIONS

"Chapter 10: Integer Division by Constants", Dec. 30, 2003, disclose in applicant's specification, found at hackersdelight.org/divcMore.pdf.*

(Continued)

*Primary Examiner* — William C Vaughn, Jr.
*Assistant Examiner* — Joseph A Towe
(74) *Attorney, Agent, or Firm* — Trop Pruner & Hu, P.C.

(57) ABSTRACT

First, the colors are partitioned within a tile into distinct groups, such that the variation of color within each group is lowered. Second, each group can be encoded in an efficient manner. The algorithm described herein may give a higher compression ratio than previous algorithms, and therefore may further reduce memory bandwidth at a very low increase in computational cost in some embodiments. The algorithm may be added to a system with existing buffer compression algorithms, handling additional tiles that the existing algorithm fails to compress, thereby increasing the overall compression rate.

24 Claims, 3 Drawing Sheets

(56) References Cited

U.S. PATENT DOCUMENTS

| | | | |
|---|---|---|---|
| 8,026,912 B1 | 9/2011 | Danskin | |
| 2003/0179925 A1 | 9/2003 | Hsu | |
| 2008/0130756 A1* | 6/2008 | Sekiguchi | H04N 19/176 375/240.24 |
| 2009/0259780 A1* | 10/2009 | Hsu | G06F 3/0231 710/63 |
| 2010/0067790 A1* | 3/2010 | Yamamoto | H04N 1/642 382/166 |
| 2010/0278422 A1* | 11/2010 | Iketani | G06T 3/403 382/165 |
| 2011/0116712 A1* | 5/2011 | Matsuhira | H04N 1/415 382/166 |
| 2011/0150330 A1* | 6/2011 | Jannard | H04N 19/46 382/166 |
| 2012/0054718 A1* | 3/2012 | Auerbach | G06F 8/436 717/116 |
| 2013/0294689 A1* | 11/2013 | Jia | H04N 19/169 382/166 |
| 2014/0177957 A1* | 6/2014 | Clark | G06T 9/00 382/166 |

FOREIGN PATENT DOCUMENTS

| | | | |
|---|---|---|---|
| WO | 2012082029 A1 | 6/2012 | |
| WO | 2013166141 A1 | 11/2013 | |

OTHER PUBLICATIONS

"Chapter 10: Integer Division by Constants", Dec. 30, 2003, disclosed in applicant's specification, found at hackersdelight.org/divcMore.pdf.*

Rasmusson, J., et al., "Exact and Error-Bounded Approximate Color Buffer Compression and Decompression," Graphics Hardware, 2007 (14 pages).

International Search Report and Written Opinion issued in corresponding PCT application No. PCT/US2015/026996 dated Aug. 20, 2015.

International Preliminary Examination Report issued in corresponding PCT application No. PCT/US2015/026996 dated Nov. 17, 2016.

JP office action in corresponding JP application No. 2016-560909 dated Jan. 26, 2018 (7 pages).

Kira, K., et al., "Adaptive Technique to Display Natural Color Images Using Limited Number of Colors," The Institute of Image Information and Television Engineers, NHK Technical Research Laboratories (6 pages) [no English translation].

Extended EP Search Report issued in corresponding EP application No. EP15788822 dated Nov. 24, 2017 (13 pages).

Clarberg, P., et al., "A sort-based deferred shading architecture for decoupled sampling," ACM Transactions on Graphics, vol. 32, No. 4, Jul. 1, 2013 (10 pages).

Clarke, R. J., "7.1 Quadtree and Recursive CodingDigital Compression of Still Images and Video," Digital Compression of Still Images and Video: {Signal Processing and its Applications], Jan. 1, 1995 (12 pages).

Guo, L., et al., "Evaluation of Palette Mode Coding on HM-12. 0+RExt-4.1, 15" JCT-VC Meeting: Oct. 23, 2013-Nov. 1, 2013, Geneva (Joint Collaborative Team on Video Coding of ISO/IEC JTC1/SC29/WG11 and ITU-T SG. 16); http://wftp3.itu.int/av-arch/jctvc-site/, No. JCTVC-OO218-v3, Oct. 23, 2013) (7 pages).

Guo, X., et al., "AHG8: Major-color-based screen content coding," 15/ JCT-VC Meeting; Oct. 23, 2013-Nov. 1, 2013; Geneva (Joint Collaborative Team on Video Coding of ISO/IEC JTC1/SC29/WG11 and ITU-T SG. 16); http://wftp3.itu.int/av-arch/jctvc-site/, No. JCTVC-OO182-v3, Oct. 25, 2013) (10 pages).

Kusswurm, D. C., "A Color Quantizer for Video Sequences," Visual Communications and Image Processing, Jan. 20, 2004-Jan. 20, 2004; San Jose, vol. 3308, Jan. 1, 1998) Jan. 1, 1998 (9 pages).

Rasmusson, J., et al., Exact and error-bounded approximate color buffer compression and decompression, Proceedings of the 22nd ACM SIGGRAPH/Eurographics Symposium, San Diego, CA (9 pages).

Salomon, D., "Palette Optimization" in Computer Graphics and Geometric Modeling, May 28, 1999, Springer (4 pages).

* cited by examiner

CLUSTERING AND ENCODING FOR COLOR COMPRESSION

BACKGROUND

This relates to graphics processing.

Reducing memory bandwidth is of utmost importance when designing a graphics architecture, as energy efficiency is the performance factor that weighs most heavily in hardware design. Transactions over memory buses may cost several orders of magnitude more than computation in terms of energy and latency. Hence, it is common to attempt to reduce bandwidth usage at the expense of more computations, thereby reducing power consumption and/or increasing overall performance. This is the motivation behind buffer compression algorithms, commonly found in graphics processing units (GPUs).

For color buffer compression, the algorithm must succeed in compressing the color data of each tile (e.g., a rectangular region of pixels) down to some threshold size if it is to be useful. For example, a tile that uses 1024 bits in uncompressed form may need to compress down to 512 bits if anything is to be gained from the compression (the sizes of compressed/uncompressed tiles vary based on the architecture and are typically related to constraints of the memory system). Hence, the more tiles that can be compressed down to those thresholds (512 bits in this example), the less bandwidth to memory is used. This ratio between the tiles that can be compressed, and the total number of tiles is called the compression rate, and it is an important metric when evaluating the efficiency of a compression algorithm. There may be several different thresholds, e.g., compressing from 2048 bits down to multiples of 512 bits: 1536 bits, or 1024 bits, or 512 bits. In this case, they may be prioritized starting at the lowest threshold (i.e. 512 in this case).

A typical color buffer compression algorithm may find the minimum color components in the tile, and then use as few bits as possible to encode the residuals relative to the minimum color component per channel. Those schemes are sometimes called offset compression methods. Note that the graphics application program interfaces (APIs) (OpenGL and DirectX) require that the color buffer is lossless, i.e., no information may be destroyed in the compression/decompression process.

BRIEF DESCRIPTION OF THE DRAWINGS

Some embodiments are described with respect to the following figures.

DETAILED DESCRIPTION

Many tiles may contain two or more distinct groups of colors. For example, a tile might contain a group of bluish colors and another group of yellowish colors. Compressing these groups together is often not very efficient. This is due to the large distance in color space between the two distinct groups, which require large residuals for compression.

First, the colors are partitioned within a tile into distinct groups, such that the variation of color within each group is lowered. Second, each group can be encoded in an efficient manner. The algorithm described herein may give a higher compression ratio than previous algorithms, and therefore may further reduce memory bandwidth at a very low increase in computational cost in some embodiments. The algorithm may be added to a system with existing buffer compression algorithms, handling additional tiles that the existing algorithm fails to compress, thereby increasing the overall compression rate.

In one embodiment of the partitioning scheme, a minimal box is defined around a tile's colors and then this box is split into a grid, with a number of disjoint cells (also box shaped), that cover the parent box in one embodiment, but other configurations may also be used, e.g., rectangular grid cells. For each cell, the minimal box of the colors that fall into that cell is found. In the worst case, this box will be as big as the grid cell itself, but if the samples form a tight group, the box is typically smaller. These boxes are then merged until some predetermined number of groups that can be stored efficiently is identified. This number depends on the size of the compressed data, so for a budget of 512 bits one could for example afford 2 or 3 groups in one embodiment. Then a minimal box around a set of colors is found and encoded in an efficient manner.

This algorithm encodes all channels together at the same time in some embodiments, which may be more efficient.

Figure 1:
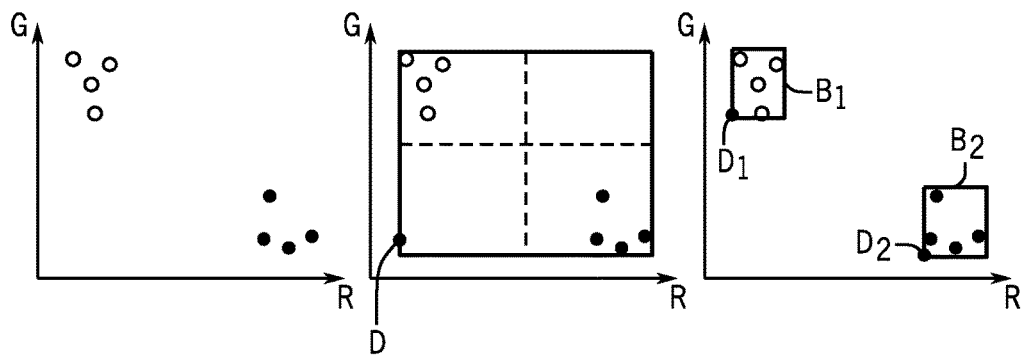
FIG. 1 is a graph of red and green channels in one hypothetical example.

Assume a tile with N colors, defined by RGB-values, for example. However, any color space may be used. In FIG. 1 only the red and green channels (R and G) are shown.

To the left of FIG. 1, the red (R) and green (G) axes are shown for 8 pixel colors, four green (open circles) and four red (closed circles). In the middle, the minimal box is drawn around the pixel colors. The circle D is at the left-bottom corner is the minimum color of these 8 pixel colors. In the middle, the minimal box is split into 2×2 cells. To the right, minimal boxes $B_1$ and $B_2$ are computed for each cell, which creates two groups. The dark circles $D_1$ and $D_2$ show the minimal colors for these two groups.

In the simplest clustering algorithm, one simply encodes each non-empty cell with the minimum color (dark circles $D_1$ and $D_2$ in FIG. 1) and then some encoding of residuals inside that box. This may be done with standard methods or with the method described below.

This example is in two dimensions, but usually there are three (RGB) or four (RGBA) dimensions. Since the coding of the minimal color of a group (or box) is rather expensive, sometimes it makes sense to merge two groups (boxes) into one. One may also choose to transform the colors into another color space, such as the pseudo-luminance or intensity (Y), orange chrominance, Co and green chrominance Cg or (YCoCg) in order to potentially reduce the volume of each box, therefore reducing the number of residual bits. For example, in images with low chrominance, most of the variance will be along the Y axis.

In an iterative scheme, the pair of groups (boxes), that increases the total volume of the resulting merged groups (boxes) the least, are merged. In RGB-space, 8 cells are obtained by splitting once per dimension. Each group only has one direct neighbor in x, y or z. One useful merging heuristic is to merge the smallest box with the neighbor that gives the smallest volume compared to merging with any other neighbor. Do this iteratively until the cost falls below the bit threshold for successful compression. Merging only needs to continue until the target bit threshold is reached (or less).

It is also possible to split more than once per dimension. This creates more cells whose minimal boxes may be merged. Each cell may get more direct neighbors in this case.

Assume that there is one group of colors to encode, and a minimum color is identified for the box around these colors in RGB-space. This minimum color may first be subtracted from all colors in the group to calculate residual components for each channel color. The largest color component, $L_R$, $L_G$, $L_B$, of each channel is then found. The "widths" of each channel are denoted as $w_R$, $w_G$, $w_B$, where $w_R = L_R + 1$, etc.

Most schemes simply use an integer number of bits to store the residual per channel. This means that for the red channel, R, for example, one finds the smallest k such that $W_R <= 2^k$, and then encodes each residual for R with k bits. However, this can become very wasteful. For example, if the largest residual is 32, then 6 bits are needed to encode that residual (since 5 bits only reaches to $2^5 - 1 = 31$).

Instead, a more efficient coding technique may be used. The ensuing description is again in RGB-space, but this generalizes to any number of channels in any color space.

Assume a color r, g, b (where the minimum color already has been subtracted as described above) is to be encoded. Note that r is a number between 0 and $w_R - 1$, and so on for the other channels.

This encoding is transformed into a single integer cost T, using the largest color components for each channel, as follows:

$$T = r + g*w_R + b*w_R*w_G \quad \text{[Equation 1]}$$

This number can at most be between 0 and $(w_R*w_G*w_B - 1)$. Hence, the smallest number k is found such that $(w_R*w_G*w_B - 1) < 2^k$ and each T is encoded with k bits.

This saves between 0 and c−1 bits per pixel, assuming that c is the number of channels per pixel. A few examples are included in Table 1 below.

TABLE 1

Examples of bit savings by encoding the residuals as a single unsigned integer instead of encoding each residual component individually.

| wR | wG | wB | Tmax | #bits/pixel | #bits naive |
|---|---|---|---|---|---|
| 8 | 8 | 8 | $7 + 7 * 8 + 7 * 8^2 = 511$ | 9 | 3 * 4 = 12 |
| 48 | 48 | 48 | $47 + 47 * 48 + 47 * 48^2 = 110591$ | 17 | 3 * 6 = 18 |
| 100 | 100 | 100 | $99 + 99 * 100 + 99 * 100^2 = 999999$ | 20 | 3 * 7 = 21 |
| 30 | 40 | 50 | $29 + 39 * 30 + 49 * 30 * 40 = 59999$ | 16 | 5 + 6 + 6 = 17 |

Next, the decoding is described. We have a number (per pixel), T, and want to decode r, g, and b.

$$b = T/(w_R*w_G)$$

$$g = (T - b*w_R*w_G)/w_R = (T \% (w_R*w_G))/w_R$$

$$r = (T - b*w_R*w_G) \% \ w_R = (T \% (w_R*w_G)) \% \ w_R \quad \text{[Equation 2]}$$

Per color group, the size of the group is stored: $w_R$, $w_G$, $w_B$ per tile. Current schemes may need to store 3 bits (for R8G8B8A8) per channel, and with the optimizations that follow the present scheme may need to store 6 bits per channel in some embodiments. Hence, the cost is increased by 6*4−3*4=12 bits, which is acceptable.

In the description above, the RGBA channels were encoded together. Another alternative is to encode all the red values isolated from the other channels, and all the green values would be encoded together isolated from the other channels, and similarly for blue and alpha as well. For example, if three red values were to be encoded in a group, one could rewrite Equation 1 as:

$$T = r1 + r2*w_R + r3*w_R*w_R \quad \text{[Equation 3]}$$

In the same way, the decoding (Equation 2) can be adjusted (simply use $w_R$ everywhere where $w_G$ (and others) were used). This could potentially be more efficient, and one could select to encode many more channel components (e.g., red-values) together in one group. For example, one could decide to encode 8 channel components (e.g., red values) together. This could possibly also be done adaptively, i.e., more and more channel components are encoded until the best tradeoff is reached, which may be that the cost, T, is as close to as a power of 2 as possible, since that uses fewer bits.

The encoding (Equation 1) and decoding (Equation 2) include both multiplications and divisions (and modulo, i.e., the %-operator). For some graphics processors, it may be desired to reduce the cost of these operations. For example, the widths of each channel, i.e., $w_R$, $w_G$, $w_B$ may be limited to make the division simpler.

Previously, the widths, $w_R$, $w_G$, $w_B$, could only take on powers of two, i.e., $2^j$. This turns divisions into shifts, but it also does not save any bits. The following widths can be used in one embodiment:

$$1*2n,$$

$$3*2n,$$

$$5*2n,$$

$$7*2n. \quad \text{[Equation 3]}$$

For RGB, divide by $w_R*w_G$. This number is described as: $\{1, 3, 5, 7\}*2n*\{1, 3, 5, 7\}*2m$ The division becomes:

$$b = T/(w_R*w_G) = T/(\{1,3,5,7\}*2^n*\{1,3,5,7\}*2^m).$$

The division by $2^n$ and $2^m$ becomes division, and then the remaining number may be divided by two numbers which are any of $\{1, 3, 5, 7\}$.

These can be implemented relatively simply in hardware as described in Integer Division by Constants, available on the Internet at hackersdelight.org/divcMore.pdf.

Another alternative is to let the widths be numbers from 0 to 15, and k*16, with k>=1. This means that division is implemented with constant numbers from 1 to 15, i.e., 1, 2, 3, 4, 5, 6, 7, 8, 9, 10, 11, 12, 13, 14, 15.

This boils down to the following divisions (not counting divisions by 2, or repeats):
3, 5, 7, 11, 13.
The rest would be shifts.

If affordable, one can encode more than one pixel into a single number. If N colors are encoded together, one can save between 0 and N−1 bits.

The two partitioning and encoding schemes described herein can be used independently of each other or together, depending on needs and practicality for example.

Figure 2:
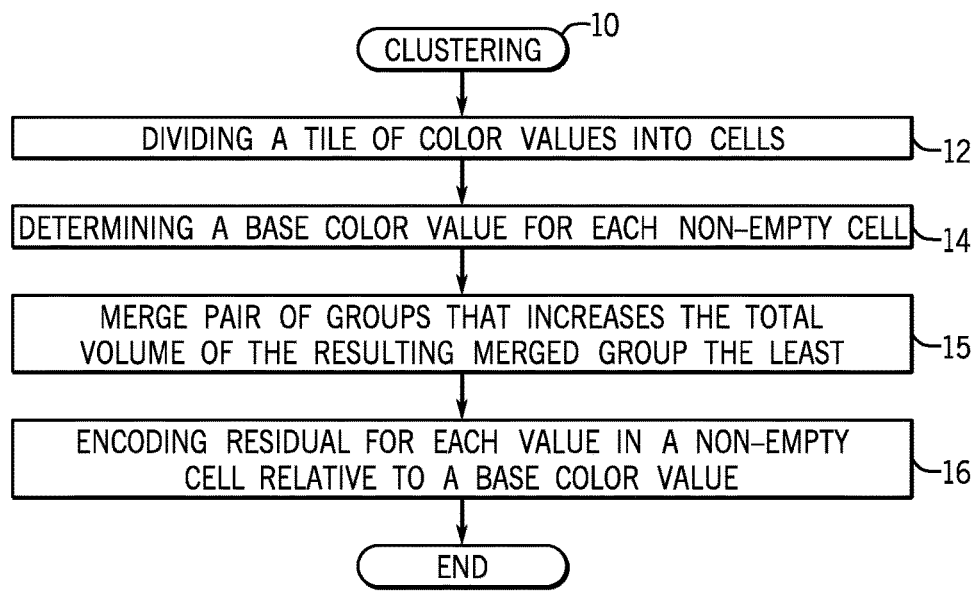
FIG. 2 is a flow chart for one partitioning embodiment.

A clustering algorithm 10, shown in FIG. 2 may be implemented in software, firmware and/or hardware. In software and firmware embodiments it may be implemented by computer executed instructions stored in one or more non-transitory computer readable media such as magnetic, optical, or semiconductor storages. For example it may be implemented in a storage associated with a graphics processor in one embodiment.

The clustering algorithm 10 begins by dividing a tile of color values into cells based on color variation within the tile as indicated in block 12. The cells may be any subdivision of a tile.

Then a base color value for each non-empty cell is determined as indicated in block 14. In one embodiment as described above, the base color value may be the minimum color value of the cell. But other values may also be used including the maximum value, a mean value or an average value to mention some examples. The pair of groups that increase the total volume of the resulting merged group the least are merged as indicated in block 15.

Finally the residual for each color value in a non-empty cell is encoded relative to the base color value as indicated in block 16. A variety of different techniques for encoding the color values have been described above. Other techniques may also be used.

Figure 3:
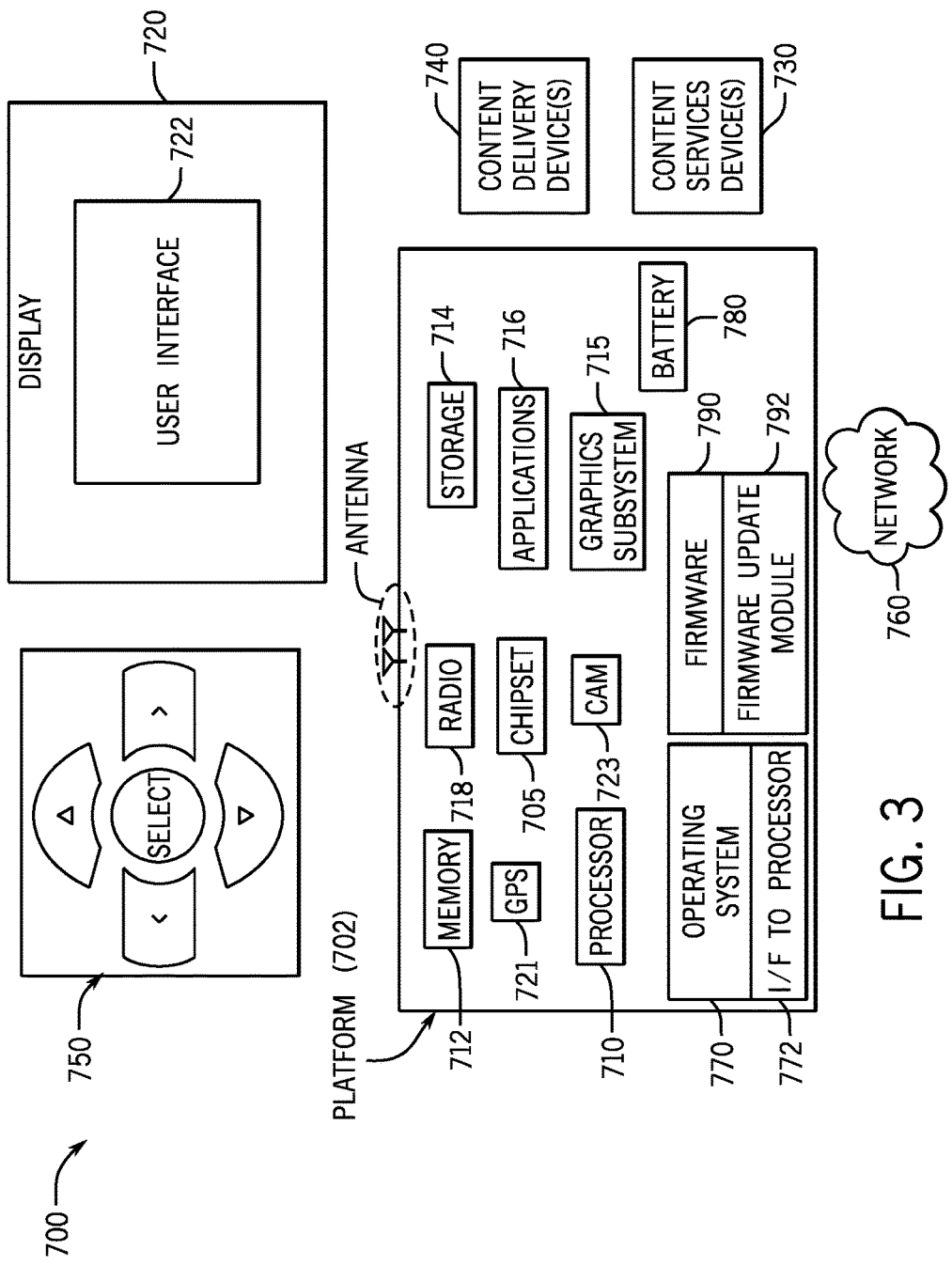
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
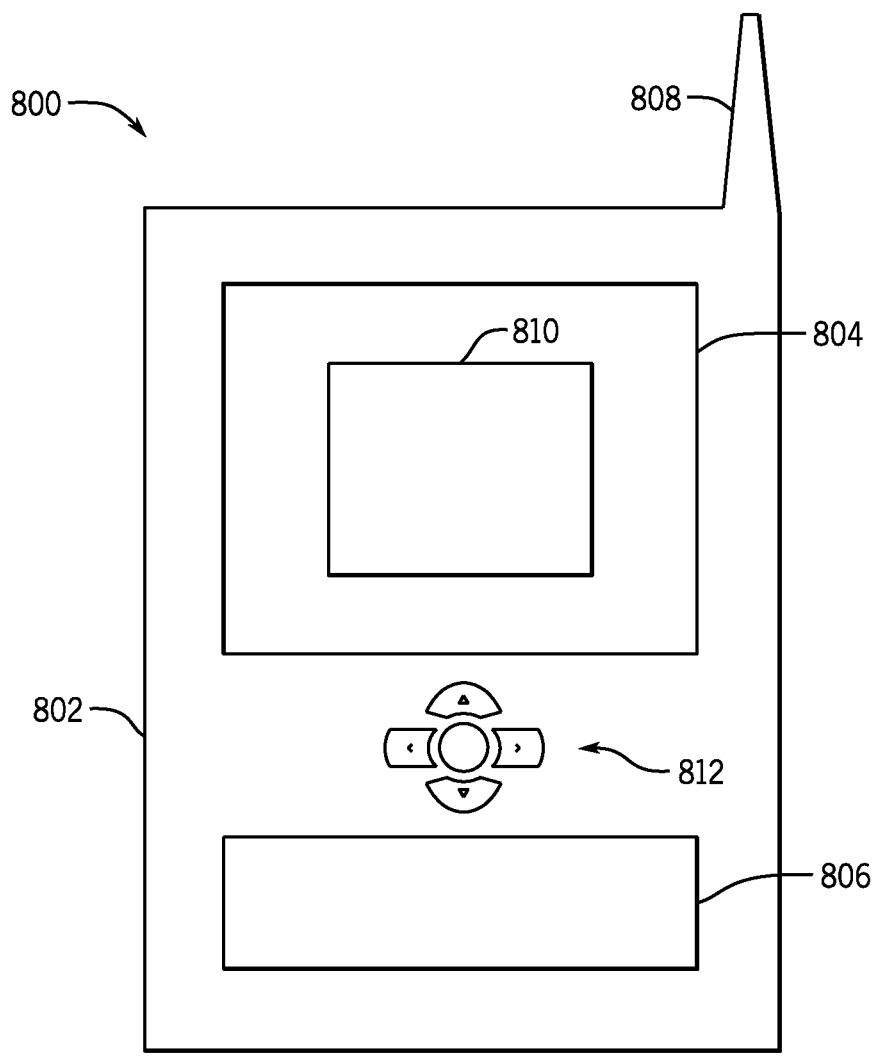
FIG. 4 is a front elevation view of one embodiment of a system.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising dividing, using a computer processor, a tile of color values into cells based on color variation within the tile, d determining a base color value for each non-empty cell, and encoding each value using the base color value. The method may also include defining a minimal box around a tile's color values, and splitting the box into cells. The method may also include merging a pair of boxes that increase a total volume of the merged boxes by the least amount. The method may also include merging the smallest box with a neighbor that gives the smallest volume compared to merging with any other neighbor and merging iteratively until the encoding cost falls below a threshold. The method may also include encoding residuals for each value in a non-empty cell relative to the base color value for that cell. The method may also include subtracting a minimum color value from all color values in a group to be encoded to form color value components for each channel. The method may also include finding a largest color value component of each channel. The method may also include transforming color encoding into a single integer cost using the largest component per channel. The method may also include encoding all channels for a color space together. The method may also include encoding without multiplication or division. The method may also include assigning widths to a set of numbers so that division is implemented with a constant over said set. The method may also include encoding multiple values of the same color component together.

Another example embodiment may be one or more non-transitory computer readable media storing instructions executed by a processor to perform a sequence comprising dividing, using a computer processor, a tile of color values into cells based on color variation within the tile, determining a base color value for each non-empty cell; and encoding each value using the base color value. The media may include defining a minimal box around a tile's color values, and splitting the box into cells. The media may include merging a pair of boxes that increase a total volume of the merged boxes by the least amount. The media may include merging the smallest box with a neighbor that gives the smallest volume compared to merging with any other neighbor and merging iteratively until the encoding cost falls below a threshold. The media may include encoding residuals for each value in a non-empty cell relative to the base color value for that cell. The media may include including encoding all channels for a color space together. The media may include encoding without multiplication or division. The media may include assigning widths to a set of numbers so that division is implemented with a constant over said set. The media may include encoding multiple values of the same color component together.

In another example embodiment may be an apparatus comprising a processor to divide a tile of color values into cells based on color variation within the tile, determine a base color value for each non-empty cell, and encode each value using the base color value, and a storage coupled to said processor. The apparatus may include said processor to define a minimal box around a tile's color values, and splitting the box into cells. The apparatus may include said processor to merge a pair of boxes that increase a total volume of the merged boxes by the least amount. The apparatus may include said processor to merge the smallest box with a neighbor that gives the smallest volume compared to merging with any other neighbor and merging iteratively until the encoding cost falls below a threshold. The apparatus may include said processor to encode residuals for each value in a non-empty cell relative to the base color value for that cell. The apparatus may include said processor to encode all channels for a color space together. The apparatus may include said processor to encode without multiplication or division. The apparatus may include said processor to include a battery. The apparatus may include said processor including firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    defining a plurality of minimal boxes around proximate groups of color samples;
    repeatedly merging pairs of said boxes to form a first merged box that meets a target bit threshold and that increases a total merged box color space volume by a least amount of color space volume, where color space volume corresponds to a three dimensional volume determined based on color coordinates for three colors;
    merging another pair of said boxes to form a second merged box;
    selecting a first and second representative colors of a color space;
    identifying, for a first merged box, a first set of color values closest to the first representative color;
    identifying, for the second merged box, a second set of color values closest to the second representative color; and
    encoding said first set separately from said second set to compress color data.

2. The method of claim 1 further including:
    determining a base color value for the first set and a base color value for the second set; and
    encoding each set using its base color value.

3. The method of claim 2 including merging the smallest box with a neighbor that gives the smallest volume compared to merging with any other neighbor and merging iteratively until the encoding cost falls below a threshold.

4. The method of claim 2 including encoding residuals for each value in a non-empty cell relative to the base color value for that cell.

5. The method of claim 2 including subtracting a minimum color value from all color values in a group to be encoded to form color value components for each channel.

6. The method of claim 4 including finding a largest color value component of each channel.

7. The method of claim 5 including transforming color encoding into a single integer cost using the largest component per channel.

8. The method of claim 2 including encoding all channels for a color space together.

9. The method of claim 2 including encoding without multiplication or division.

10. The method of claim 2 including assigning widths to a set of numbers so that division is implemented with a constant over said set.

11. The method of claim 2 including encoding multiple values of the same color component together.

12. One or more non-transitory computer readable media storing instructions to perform a sequence comprising:
defining a plurality of minimal boxes around proximate groups of color samples;
repeatedly merging pairs of said boxes to form a first merged box that meets a target bit threshold and that increases a total merged box color space volume by a least amount of color space volume, where color space volume corresponds to a three dimensional volume determined based on color coordinates for three colors;
merging another pair of said boxes to form a second merged box;
selecting a first and second representative colors of a color space;
identifying, for a first merged box, a first set of color values closest to the first representative color;
identifying, for the second merged box, a second set of color values closest to the second representative color; and
encoding said first set separately from said second set to compress color data.

13. The media of claim 12 said sequence including:
determining a base color value for the first set and a base color value for the second set; and
encoding each set using its base color value.

14. The media of claim 13, said sequence including merging the smallest box with a neighbor that gives the smallest volume compared to merging with any other neighbor and merging iteratively until the encoding cost falls below a threshold.

15. The media of claim 13, said sequence including encoding residuals for each value in a non-empty cell relative to the base color value for that cell.

16. The media of claim 13, said sequence including encoding all channels for a color space together.

17. The media of claim 13, said sequence of including encoding without multiplication or division.

18. The media of claim 13, said sequence including assigning widths to a set of numbers so that division is implemented with a constant over said set.

19. The media of claim 13, said sequence including encoding multiple values of the same color component together.

20. An apparatus comprising:
a processor to define a plurality of minimal boxes around proximate groups of color samples, repeatedly merge pairs of said boxes to form a first merged box that meets a target bit threshold and that increases a total merged box color space volume by a least amount of color space volume, where color space volume corresponds to a three dimensional volume determined based on color coordinates for three colors, merge another pair of said boxes to form a second merged box, select a first and second representative colors of a color space, identify, for a first merged box, a first set of color values closest to the first representative color, identify, for the second merged box, a second set of color values closest to the second representative color, encode said first set separately from said second set to compress color data; and
a memory coupled to said processor. and merging iteratively until the encoding cost falls below a threshold.

21. The apparatus of claim 20 wherein:
said processor to determine a base color value for the first set and a base color value for the second set, and encode each set using the base color value.

22. The apparatus of claim 21, said processor to merge the smallest box with a neighbor that gives the smallest volume compared to merging with any other neighbor and merging iteratively until the encoding cost falls below a threshold.

23. The apparatus of claim 21, said processor to encode residuals for each value in a non-empty cell relative to the base color value for that cell.

24. The apparatus of claim 21, said processor to encode all channels for a color space together.

* * * * *

UNITED STATES PATENT AND TRADEMARK OFFICE
CERTIFICATE OF CORRECTION

PATENT NO. : 10,045,029 B2
APPLICATION NO. : 14/270435
DATED : August 7, 2018
INVENTOR(S) : Tomas G. Akenine-Moller et al.

It is certified that error appears in the above-identified patent and that said Letters Patent is hereby corrected as shown below:

In the Claims

Column 12, Claim 20:
Lines 33-34 delete "and" through "threshold".

Signed and Sealed this
Second Day of October, 2018

Andrei Iancu
*Director of the United States Patent and Trademark Office*